US008078876B2

(12) United States Patent
Brickell et al.

(10) Patent No.: US 8,078,876 B2
(45) Date of Patent: Dec. 13, 2011

(54) APPARATUS AND METHOD FOR DIRECT ANONYMOUS ATTESTATION FROM BILINEAR MAPS

(75) Inventors: Ernest F. Brickell, Portland, OR (US); Jiangtao Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 933 days.

(21) Appl. No.: 11/778,804

(22) Filed: Jul. 17, 2007

(65) Prior Publication Data

US 2008/0270786 A1    Oct. 30, 2008

Related U.S. Application Data

(60) Provisional application No. 60/915,035, filed on Apr. 30, 2007.

(51) Int. Cl.
*H04L 9/32* (2006.01)
*G06F 7/00* (2006.01)
*G06F 7/04* (2006.01)

(52) U.S. Cl. ........ 713/176; 707/756; 713/150; 713/168; 726/26

(58) Field of Classification Search ........................ None
See application file for complete search history.

(56) References Cited

U.S. PATENT DOCUMENTS

| | | | |
|---|---|---|---|
| 4,529,870 A | 7/1985 | Chaum | |
| 7,490,070 B2 | 2/2009 | Brickell | |
| 7,555,652 B2 * | 6/2009 | Camenisch | 713/180 |
| 7,581,107 B2 * | 8/2009 | Camenisch | 713/176 |
| 2004/0260926 A1 | 12/2004 | Arditti Modiano et al. | |
| 2005/0010535 A1 | 1/2005 | Camenisch | |
| 2006/0010079 A1 * | 1/2006 | Brickell | 705/67 |
| 2007/0101138 A1 * | 5/2007 | Camenisch | 713/168 |
| 2007/0192580 A1 | 8/2007 | Challener et al. | |
| 2008/0046581 A1 | 2/2008 | Molina et al. | |
| 2009/0019291 A1 * | 1/2009 | Murray | 713/193 |

OTHER PUBLICATIONS

Brickell et al., "Direct Anonymous Attestation", CCS '04, ACM Oct. 2004, pp. 132-145.*
Boneh et al., "Short Group Signatures", International Association for Cryptographic Research 2004, pp. 41-55.*
Boneh et al., "Group Signatures with Verifier-Local Revocation", CCS '04, ACM Oct. 2004, ppl. 168-177.*

(Continued)

*Primary Examiner* — Peter Poltorak
*Assistant Examiner* — William Powers
(74) *Attorney, Agent, or Firm* — Blakely, Sokoloff, Taylor & Zafman LLP

(57) ABSTRACT

A method and apparatus for direct anonymous attestation from bilinear maps. In one embodiment, the method includes the creation of a public/private key pair for a trusted membership group defined by an issuer; and assigning a unique secret signature key to at least one member device of the trusted membership group defined by the issuer. In one embodiment, using the assigned signature key, a member may assign a message received as an authentication request to prove membership within a trusted membership group. In one embodiment, a group digital signature of the member is verified using a public key of the trusted membership group. Accordingly, a verifier of the digital signature is able to authenticate that the member is an actual member of the trusted membership group without requiring of the disclosure of a unique identification information of the member or a private member key to maintain anonymity of trusted member devices. Other embodiments are described and claimed.

25 Claims, 9 Drawing Sheets

OTHER PUBLICATIONS

Brickell, E., et al., "SafeID: A direct anonymous attestation scheme with enhanced revocation", Intel Corporation, (Apr. 26, 2007),1-23.

Ge, H., et al., "A group signature scheme with signature claiming and variable linkability", IEEE, (2006), 497-504.

Intel Corporation, Korean Notice of Preliminary Rejection dated Apr. 21, 2010 for KR 10-2008-69771.

Non-Final Office Action for China Application No. 200810133628.3 Mailed Nov. 12, 2010, 12 pages.

Translation of Office Action for Japanese Patent Application No. 2008-179668 mailed Apr. 27, 2011, 5 pages.

Tanaka, Daiji, et al., "Group Signature Scheme with an Efficient Revocation", IPSJ SIG Technical Report, Japan, Information Processing Society of Japan, Mar. 17, 2006, vol. 2006, No. 26 pp. 171-176.

Office Action for U.S. Appl. No. 11/948,862 mailed Jun. 14, 2011, 23 pages.

* cited by examiner ial Appli-
APPARATUS AND METHOD FOR DIRECT ANONYMOUS ATTESTATION FROM BILINEAR MAPS

RELATED APPLICATIONS

This application claims priority of U.S. Provisional Application 60/915,035, filed Apr. 30, 2007. The present application is also related to co-pending U.S. patent application Ser. No. 11/948,861, filed Nov. 30, 2007, entitled "AN APPARATUS AND METHOD FOR ENHANCED REVOCATION OF DIRECT PROOF AND DIRECT ANONYMOUS ATTESTATION" and co-pending U.S. patent application Ser. No. 11/948,862, filed Nov. 30, 2007, entitled "AN APPARATUS AND METHOD FOR ISSUER BASED REVOCATION OF DIRECT PROOF AND DIRECT ANONYMOUS ATTESTATION."

FIELD OF THE INVENTION

One or more embodiments of the invention relate generally to the field of cryptography. More particularly, one or more of the embodiments of the invention relates to a method and apparatus for direct anonymous attestation from bilinear maps.

BACKGROUND OF THE INVENTION

For many modern communication systems, the reliability and security of exchanged information is a significant concern. To address this concern, the Trusted Computing Platform Alliance (TCPA) developed security solutions for platforms. In accordance with a TCPA specification entitled "Main Specification Version 1.1b," published on or around Feb. 22, 2002, each personal computer (PC) is implemented with a trusted hardware device referred to as a Trusted Platform Module (TPM).

During operation, an outside party (referred to as a "verifier") may require authentication of the TPM. This creates two opposing security concerns. First, the verifier needs to be sure that requested authentication information is really coming from a valid TPM. Second, an owner of a PC including the TPM wants to maintain as much privacy as possible. In particular, the owner of the PC wants to be able to provide authentication information to different verifiers without those verifiers being able to determine that the authentication information is coming from the same TPM.

The REAL ID Act of 2005 is Division B of an act of the United States Congress titled Emergency Supplemental Appropriations Act for Defense, the Global War on Terror, and Tsunami Relief, 2005, Pub. L. No. 109-13, 119 Stat. 231 (May 11, 2005). The Real ID Act of 2005 creates a standard for the issuing of state driver's licenses. The Real ID Act is a law imposing federal technological standards and verification procedures on state driver's licenses and identification cards, many of which are beyond the current capacity of the federal government, and mandating state compliance by May 2008. One attempt to implement the Real ID Act on state driver's licenses generally exposes privacy sensitive information of the holder of the card. Unfortunately, such security information is often sold, without the owners consent, and used to conduct fraudulent transactions in the owner's name but without the owner's consent. Such activity is generally known as identity theft, which is a widespread phenomenon that is destroying the credit of innocent victims on a daily basis.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
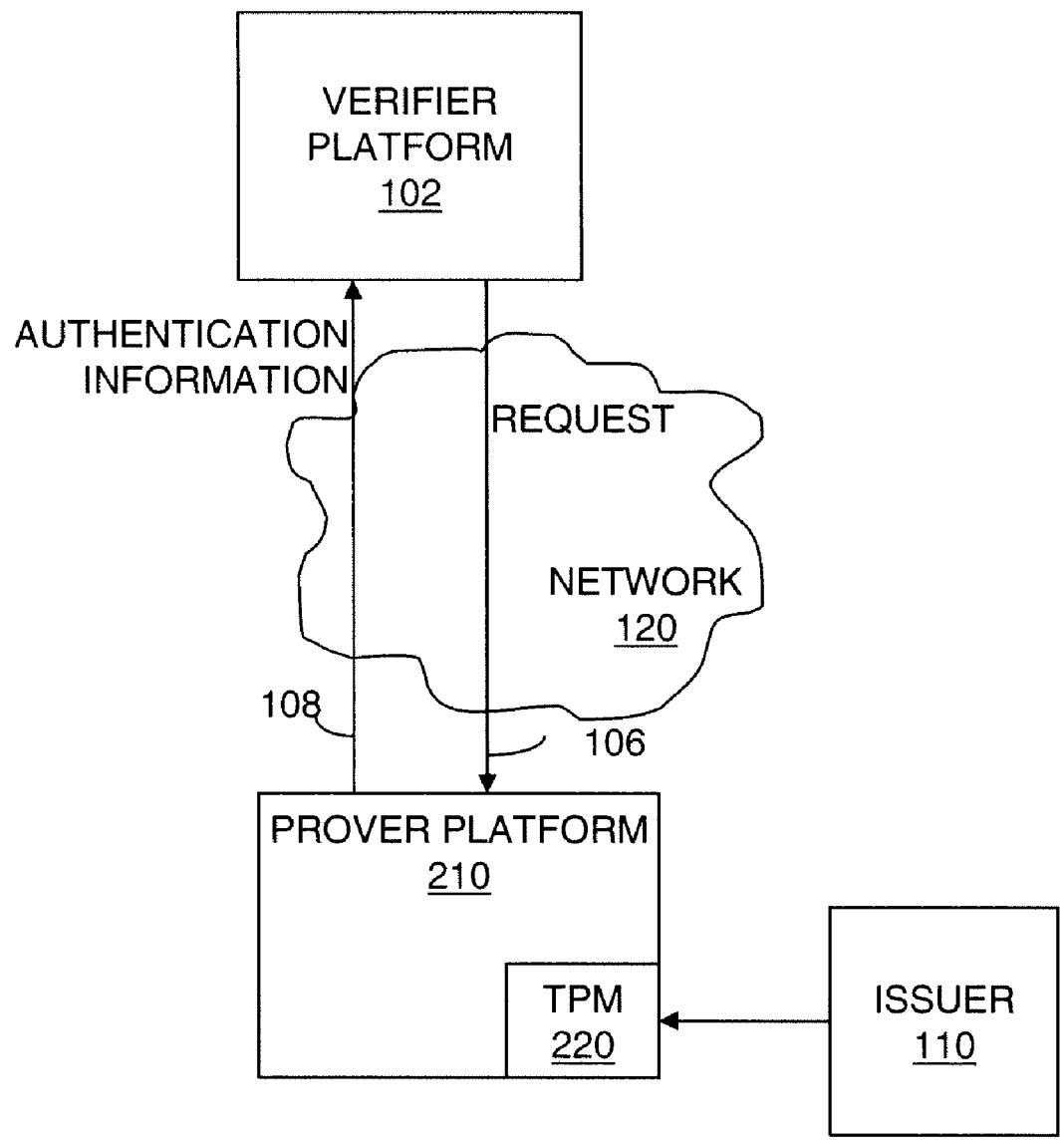
FIG. 1 is a block diagram illustrating a system featuring a platform implemented with a trusted platform module (TPM), in accordance with one embodiment.

A method and apparatus for direct anonymous attestation from bilinear maps are described. In one embodiment, the method includes the creation of a public/private key pair for a trusted membership group defined by an issuer; and assigning a unique secret signature key to at least one anonymous member device of the trusted membership group defined by the issuer. In one embodiment, using the assigned signature key, a member may sign a message received as an authentication request to form a group digital signature. In one embodiment, the group digital signature of the member can be verified using the public key of the trusted membership group. As a result, a verifier of the group digital signature is able to authenticate that the member is an actual (trusted) member of the trusted membership group without requiring the disclosure of any unique identification information of the member or a unique private or public member key to enable a trusted member device to remain anonymous to the verifier.

In one embodiment, an anonymous hardware device engages in a certification (join) procedure with the issuer to form a secret (private) signature key to become a member of the trusted membership group. In one embodiment, the member device includes a trusted platform module (TPM) to digitally sign a message with the private signature key. For one embodiment, the functionality of the TPM to form the private signature key and digitally sign a message is deployed as firmware. However, it is contemplated that such functionality may be deployed as dedicated hardware or software. Instructions or code forming the firmware or software are stored on a machine-readable medium.

Herein, "machine-readable medium" may include, but is not limited to a floppy diskette, hard disk, optical disk (e.g., CD-ROMs, DVDs, mini-DVDs, etc.), magneto-optical disk, semiconductor memory such as read-only memory (ROM), random access memory (RAM), any type of programmable read-only memory (e.g., programmable read-only memory "PROM", erasable programmable read-only memories "EPROM", electrically erasable programmable read-only memories "EEPROM", or flash), magnetic or optical cards, or the like. It is contemplated that a signal itself and/or a communication link can be regarded as machine-readable medium since software may be temporarily stored as part of a downloaded signal or during propagation over the communication link.

In the following description, certain terminology is used to describe certain features of one or more embodiments of the invention. For instance, "platform" is defined as any type of communication device that is adapted to transmit and receive information. Examples of various platforms include, but are not limited or restricted to computers, personal digital assistants, cellular telephones, set-top boxes, facsimile machines, printers, modems, routers, smart cards, USB tokens, an identification card, driver's license, credit card or other like form factor device including an integrated circuit, or the like. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

A "verifier" refers to any entity (e.g., person, platform, system, software, and/or device) that requests some verification of authenticity or authority from another entity. Normally, this is performed prior to disclosing or providing the requested information. A "prover" refers to any entity that has been requested to provide some proof of its authority, validity, and/or identity. A "prover" may be referred to as "signer" when the prover responds to an authentication request by signing a message using a private signature key. An "issuer" defines a trusted membership group and engages with hardware devices to join the trusted membership group. A "device manufacturer," which may be used interchangeably with "certifying manufacturer," refers to any entity that manufactures or configures a platform or device (e.g., a Trusted Platform Module). An issuer may be a device/certifying manufacturer.

As used herein, to "prove" or "convince" a verifier that a prover has possession or knowledge of some cryptographic information (e.g., signature key, a private key, etc.) means that, based on the information and proof disclosed to the verifier, there is a high probability that the prover has the cryptographic information. To prove this to a verifier without "revealing" or "disclosing" the cryptographic information to the verifier means that, based on the information disclosed to the verifier, it would be computationally infeasible for the verifier to determine the cryptographic information. Such proofs are hereinafter referred to as direct proofs.

Throughout the description and illustration of the various embodiments discussed hereinafter, coefficients, variables, and other symbols (e.g., "h") are referred to by the same label or name. Therefore, where a symbol appears in different parts of an equation as well as different equations or functional description, the same symbol is being referenced.

FIG. 1 illustrates system 100 featuring a platform implemented with a trusted hardware device (referred to as "Trusted Platform Module" or "TPM") in accordance with one embodiment. A first platform 102 (Verifier) transmits an authentication request 106 to a second platform 200 (Prover) via network 120. In response to request 106, second platform 200 provides the authentication information 108. In one embodiment, network 120 forms part of a local or wide area network, and/or a conventional network infrastructure, such as a company's Intranet, the Internet, or other like network.

Additionally, for heightened security, first platform 102 may need to verify that prover platform 200 is manufactured by either a selected device manufacturer or a selected group of device manufacturers (hereinafter referred to as "device manufacturer(s) (issuer) 110"). In one embodiment, first platform 102 challenges second platform 200 to show that it has cryptographic information (e.g., a private signature key) generated by issuer 110. Second platform 200 replies to the challenge by providing authentication information, in the form of a reply, to convince first platform 102 that second platform 200 has cryptographic information generated by issuer 110, without revealing the cryptographic information or any device/platform identification information, referred to herein as "unique, device identification information" to enable a trusted member device to remain anonymous to the verifier.

Figure 2:
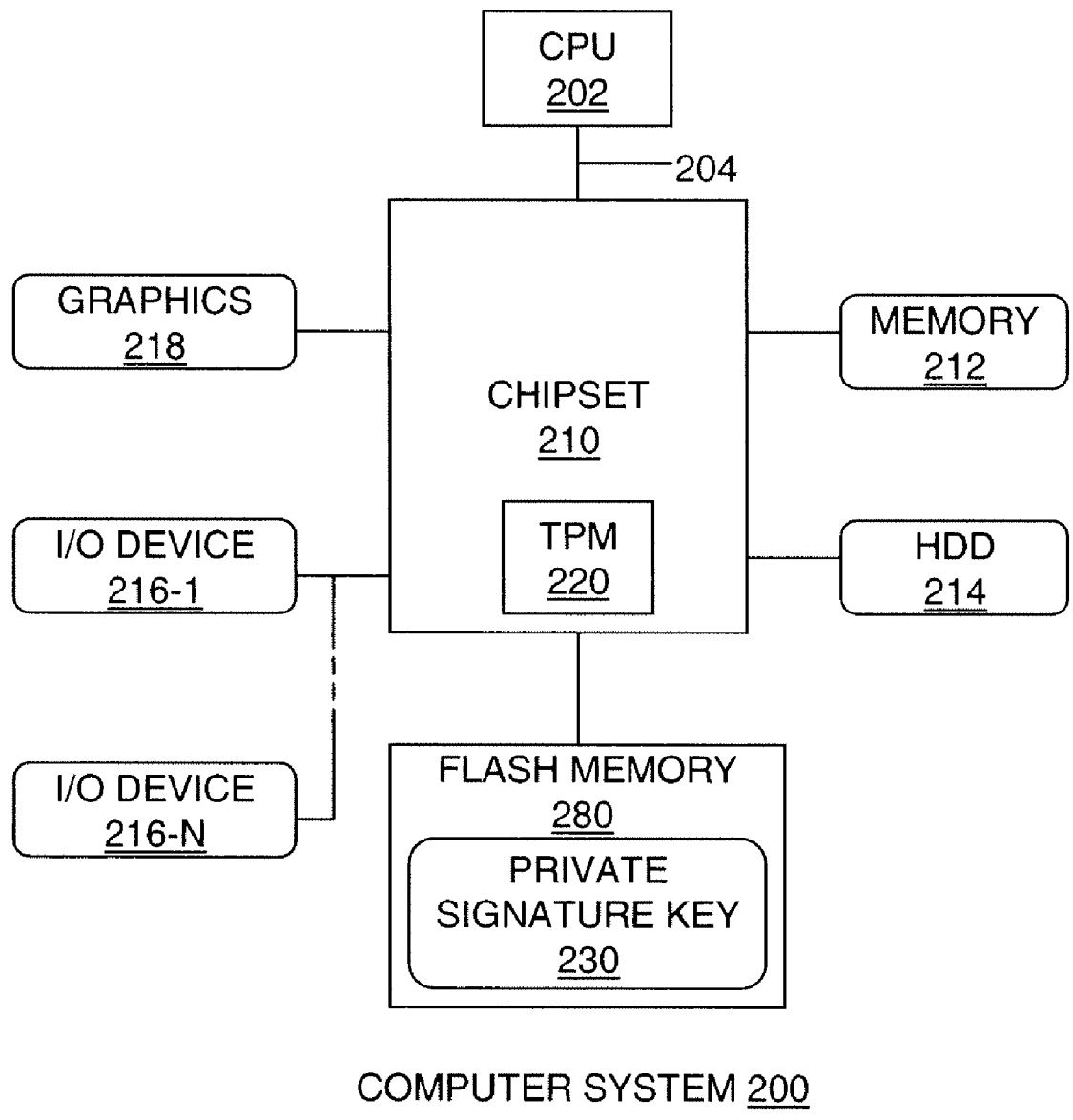
FIG. 2 is a block diagram further illustrating the platform of FIG. 1, in accordance with one embodiment.

FIG. 2 is a block diagram further illustrating an embodiment of anonymous platform 200 including TPM 220 having a group membership certificate that is common to all of the TPMs in the same group as TPM 220, and a private memory key to provide a digital signature that can be verified using the group membership certificate. In one embodiment, TPM 220 in combination with platform 200 generates authentication information using private unique signature key 230 to prove to a verifier that platform 200 is a member of a trusted membership group defined by an issuer 110 (e.g., device manufacturer), without disclosure of any unique device identification information including the private unique signature key to enable trusted platform 200 to remain anonymous to verifier 102 (FIG. 1). Representatively, computer system 200 comprises a processor system bus (front side bus (FSB)) 204 for communicating information between processor (CPU) 202 and chipset 210. As described herein, the term "chipset" is used in a manner to collectively describe the various devices coupled to CPU 202 to perform desired system functionality.

Representatively, graphics block 218, as well as hard drive devices (HDD) 214 and main memory 212 are coupled to chipset 210. In one embodiment, graphics block 218 comprises a graphics chipset, or alternatively, chipset 210 may incorporate graphics block 218 and operate as a graphics memory controller hub (GMCH). In one embodiment, chipset 210 is configured to include a memory controller and/or an input/output (I/O) controller to communicate with I/O devices 216 (216-1, . . . , 216-N). In one embodiment, main memory 212 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

Figure 3:
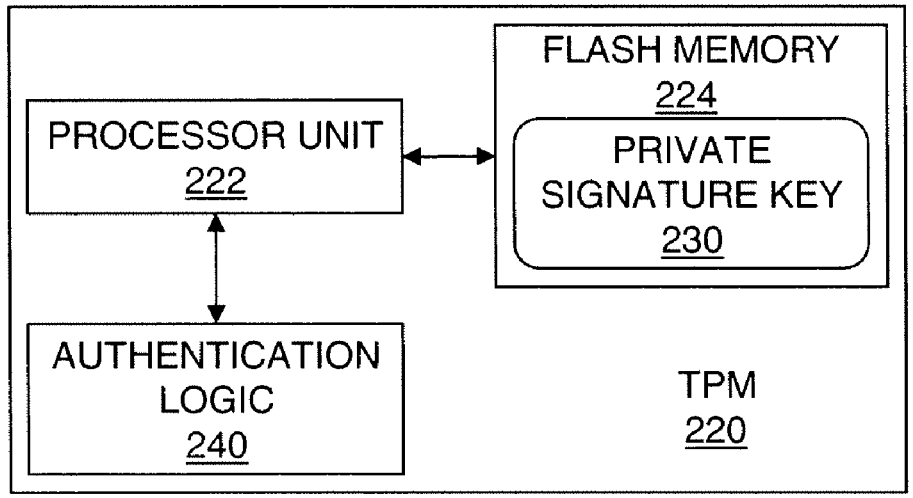
FIG. 3 is a block diagram further illustrating the TPM of FIGS. 1 and 2, in accordance with one embodiment.

FIG. 3 further illustrates Trusted Platform Module (TPM) 220 of second platform 200, in accordance with one embodiment. TPM 220 is a cryptographic device that is manufactured by device manufacturer. In one embodiment, TPM 220 comprises processor unit 222 with a small amount of on-chip memory encapsulated within a package. In one embodiment, the encapsulated memory may be used to store a private unique membership key 230 generated during a join procedure with an issuer 110. TPM 220 is configured to provide authentication information to first platform 102 that would enable it to determine that the authentication information is transmitted from a valid TPM. The authentication information used is randomized data that would make it highly likely that the TPM's or second platform's identify can be determined.

In one embodiment, TMP 220 further comprises non-volatile memory 224 (e.g., flash) to permit storage of cryptographic information such as one or more of the following: keys, hash values, signatures, certificates, etc. In one embodiment, the cryptographic information is a private signature key received from an issuer 110 such as, for example, a certifying manufacturer. As shown below, a hash value of "X" may be represented as "Hash(X)". Of course, it is contemplated that such information may be stored within external memory 280 of platform 200 in lieu of flash memory 224. The cryptographic information may be encrypted, especially if stored outside TPM 220.

In one embodiment, TPM 220 includes authentication logic 240 to respond to an authentication request from a verifier platform. In one embodiment, authentication logic 240 computes a digital signature according to a received message using private signature key 230 to convince or prove to the verifier platform that TPM 220 has stored cryptographic information generated by an issuer of a trusted membership group, without revealing any unique device/platform identification information. As a result, authentication logic 240 performs the requested authentication while preserving the identity of the prover platform to maintain anonymity of platform 200. Authentication logic 240 is further illustrated with reference to FIG. 4.

In one embodiment, certification logic 250 forms private signature key 230 during a one-round certification procedure with an issuer of private signature key 230. In one embodiment, signature logic 260 may sign a message received as part of an authentication request from a verifier. Representatively, revoked key logic 270 convinces or proves to a verifier platform that a private member key component of private signature key 230 held by platform 200 is not a revoked (compromised) private member key. In an alternate embodiment, verification that the private signature key is not a revoked signature key is performed by a verifier. It is appreciated that a lesser or more equipped computer than described above may be desirable for certain implementations.

In one embodiment, each hardware device, which is a member of a trusted membership group, is assigned a unique, private signature key by an issuer. Representatively, a trusted member device, having an assigned private signature key, is able to sign a message received as part of an authentication request from a verifier. However, in contrast to a traditional digital signature system, verification of a group digital signature created with a unique, private signature key of a member device is verified using a group public key for the trusted membership group defined by the issuer. Using its private signature key, a member device of a trusted membership group limits the disclosure of unique device identification information to an indication that the device is a member of a trusted membership group of trusted hardware devices, which may be defined by a certifying manufacturer.

In one embodiment, authentication logic 240 enables one to prove that he is a member in a group without revealing any information about his identity. A member of a group has a credential ("group membership certificate") that may be used to prove membership in the group. In one embodiment, the credentials consist of a private member key and the group membership certificate. The private signature key is unique for every different member of the group and each member selects a secret random value as a private member key of the member that is unknown to the issuer. However, a group public key of the trusted membership group is the same for all members of the group.

As described herein, the issuer, such as issuer 110, is the entity that establishes that a person (or an entity) is a member of a group, and then issues a credential to the member that is used to form a private signature key of the member. As further described herein, the prover is a person or entity that is trying to prove membership in the group. If the prover is indeed a member in the group and has a valid credential, the proof should be successful. As further described herein, the verifier is the entity that is trying to establish whether the prover is a member of the group or not. So the prover is tying to prove membership to the verifier.

Figure 4:
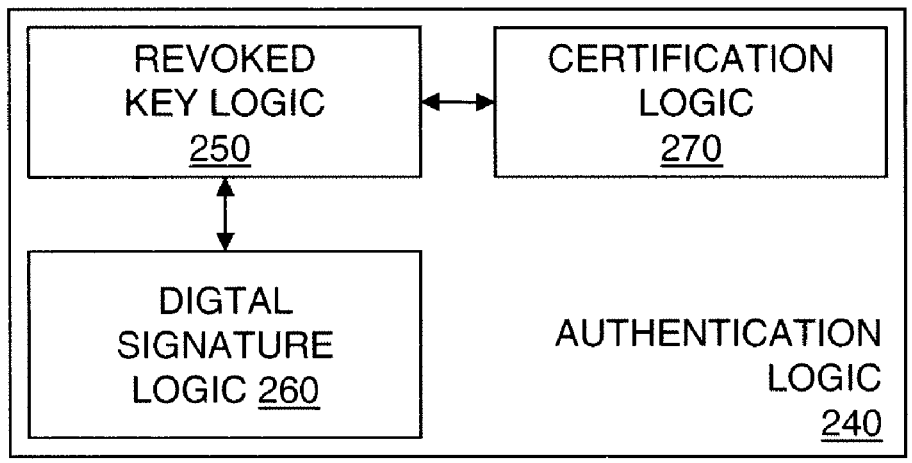
FIG. 4 is a block diagram further illustrating authentication logic of FIG. 3, in accordance with one embodiment.

As shown in FIG. 4, to prove membership, a verifier requests that the prover digitally sign some messages in, for example, digital signature logic 260. If the verifier needs to know that the message was signed at the current time, then the verifier would create a random value (a nonce) that is given to the prover to include in the signature. The prover signs the message using a private signature key and sends the signature to the verifier. As described herein, such signature is referred to as a group digital signature since it is verified with the published, group public key of the trusted membership group.

In one embodiment, a verifier can verify the signature using the group public key and, if verification succeeds, the verifier knows that the prover is a member of a trusted group. If the nonce was used, the verifier knows that the group signature was created between the time he sent the nonce and the time the signature was received. Hence, the verifier does not learn which member created the group digital signature to maintain anonymity of trusted members of a group.

In one embodiment, TPM 220 may be incorporated on a smart card, including a form factor of a PCMCIA card for insertion into a PCMCIA slot, or incorporated on an identification device such as a driver's license, identification card, credit card or other like configuration having the form fact of the standard driver's license/credit card and including an integrated circuit to perform one or more cryptographic procedures as described herein. However, it should be recognized that certain cryptographic functions may be computed by an attached host, such as platform 200. According to such a configuration, use of TPM 220 on, for example, a driver's license would enable conformance with the Real ID Act of 2005, as referred to above, without the disclosure of privacy sensitive information.

According to such a configuration, the Department of Motor Vehicles, or DMV, is the issuer and engages in a setup procedure to create a group public key and a group issuing private key. The issuer publishes the public key and keeps the group issuing private key private. According to such a procedure, for each issued driver's license, a general procedure is followed to provide a user private signature key from the issuer including a private member key component that is unknown to the issuer. Accordingly, the user private signature key together with the group public key is the user's credential for this group.

In accordance with such an embodiment, when TPM 220, as well as authentication logic, as shown in FIG. 4, is incorporated onto a card having a form factor of a standard driver's license, credit card or other like smart card device for accessing bank machines or the like, a holder of the card can engage in a verification procedure to prove that the owner of the card is not a revoked member without requiring, for example, the issuer (DMV) to have a copy of the compromised private keys.

Figure 5:
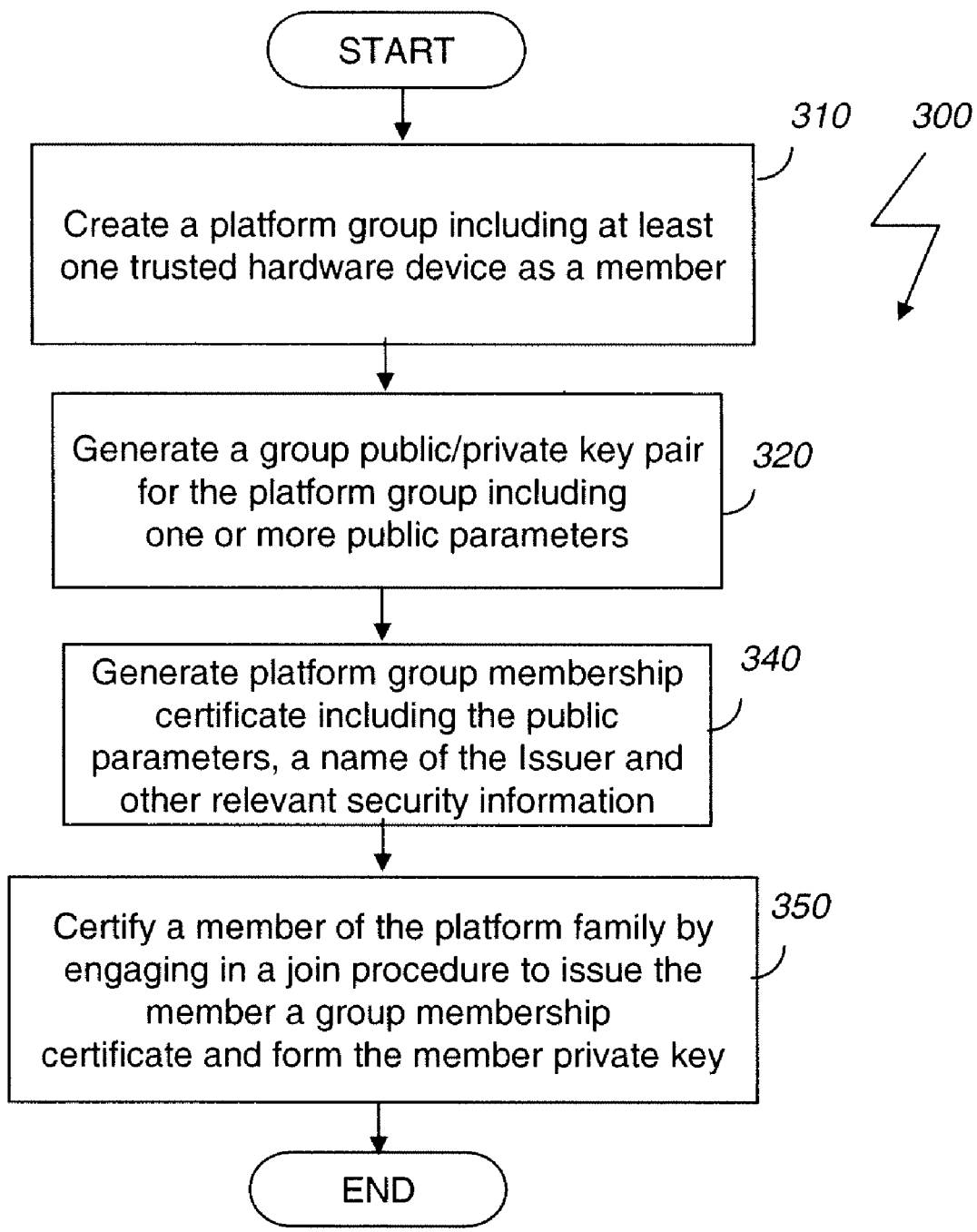
FIG. 5 is a flowchart illustrating a method for establishing a trusted membership group of trusted member devices, in accordance with one embodiment.

FIG. 5 is a flowchart illustrating a method 400 to form a trusted membership group public key in accordance with one embodiment. A "trusted membership group" may be defined by the issuer to include one or more types of platforms or devices. For instance, a trusted membership group may be the set of all platforms (members) that have a common element of security relevant information, such as a group public key. This security relevant information could include the manufacturer and model number of the particular platform or device. For each trusted membership group, an issuer creates cryptographic parameters that are used for that trusted membership group. The issuer creates a private signature key during a join procedure that is used to sign messages, received by member devices (e.g., platform 200 or TPM 220), to convince a verifier that the device is a member of a trusted membership group.

In one embodiment, an issuer creates a trusted membership group including at least one trusted hardware device as a member device (block 310). In one embodiment, the issuer utilizes a public key cryptographic function (e.g., elliptical curve cryptography) to create a group public/private key pair. This can be created using well known methods, such as those described in *Applied Cryptography*, by Bruce Schneier, John Wiley & Sons; ISBN: 0471117099; Second Edition (1996).

The issuer generates a group membership certificate that comprises public parameters, the security relevant information of the trusted membership group. Once the Platform group public/private key is generated, a certification procedure of each member device of the trusted group is performed (block 350). As part of the certification process, the issuer provides the group membership certificate to the members or devices of the trusted group. The distribution of cryptographic parameters associated with the group membership certificate from a prover (e.g., second platform 200 in FIG. 1) to a verifier may be accomplished in a number of ways. However, these cryptographic parameters should be distributed to the verifier in such a way that the verifier is convinced that the group membership certificate was generated by the issuer.

For instance, one accepted method is by distributing the parameters directly to the verifier. Another accepted method is by distributing the group membership certificate signed by a certifying authority, being the issuer as one example. In this latter method, the public key of the certifying authority should be distributed to the verifier, and the signed group membership certificate can be given to each member in the trusted group (prover platform). The prover platform can then provide the signed Group Membership Certificate to the verifier.

Figure 6:
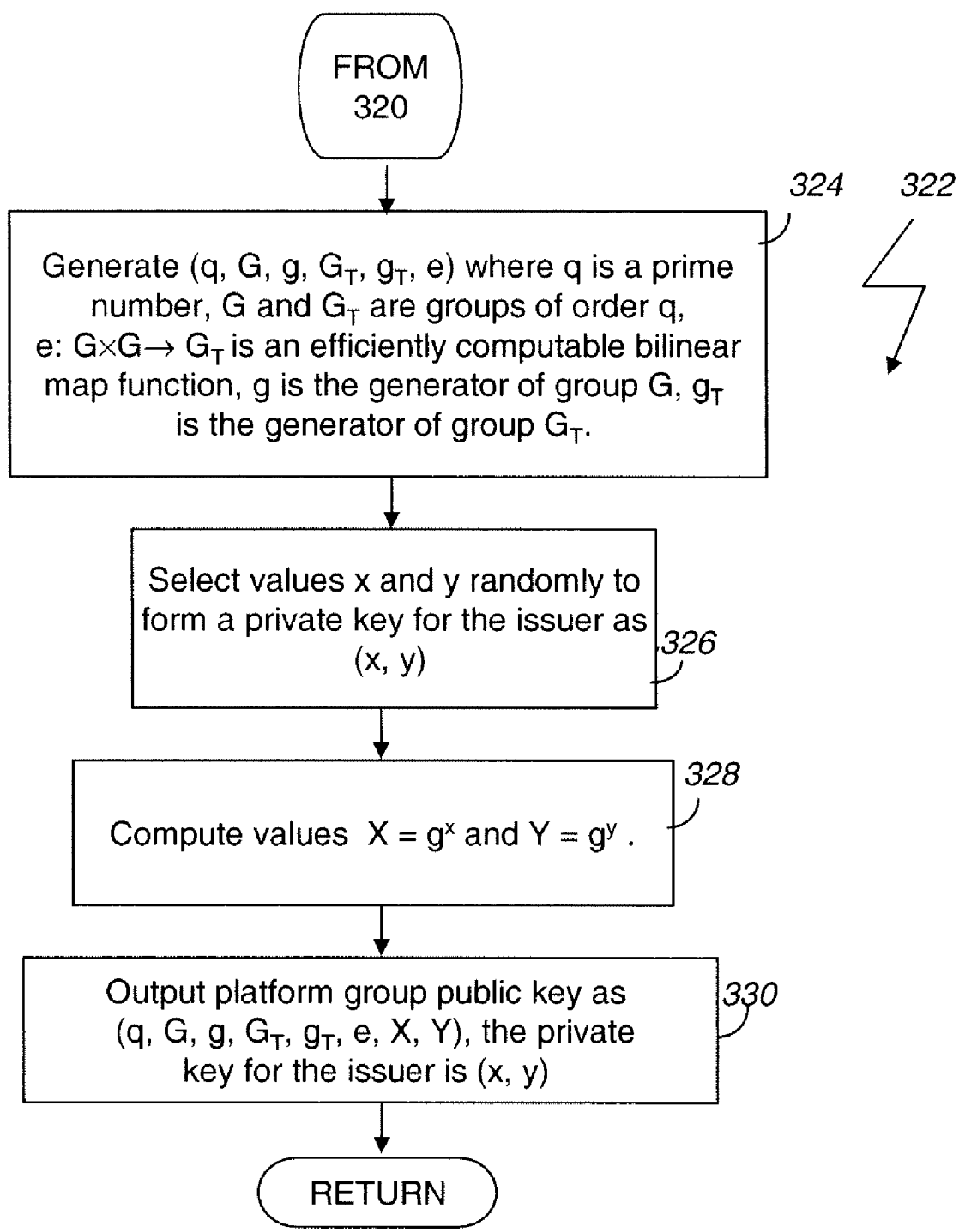
FIG. 6 is a flowchart illustrating a method for generating a group public/private key pair and one or more public parameters, in accordance with one embodiment.

FIG. 6 is a flowchart illustrating a method 322 for generating a group public/private key pair for the platform group including one or more public parameters of process block 320 of FIG. 5, according to one embodiment. Generation of the public/private key pair and platform parameters for a platform group enables member devices to identify themselves as trusted member devices without revealing any unique, device identification information. In one embodiment, generation of the group public parameters, as described with reference to FIG. 6, is referred to herein as a set-up protocol.

In one embodiment, the set-up protocol is used by the hardware manufacturer (issuer) to create the public/private key pair and other cryptographic parameters needed by the manufacturer to certify member devices in order to generate a unique private signature key for each member device of the trusted group defined by an issuer.

Referring again to FIG. 6, at process block 324, the issuer generates $(q, G, g, G_T, g_T, e)$, where q is a prime number, G and $G_T$ are groups of order q, e: $G \times G \rightarrow G_T$ is an efficiently computable bilinear map function, g is the generator of group G, $g_T$ is the generator of group $G_T$. In one embodiment, a group digital signature is generated using a private signature key to enable attestation based on bilinear maps. For example, suppose there are two groups $G=\langle g \rangle$ and $G_T=\langle g_T \rangle$, with prime order q. A non-degenerate efficiently computable bilinear map e, e: $G \times G \rightarrow G_T$, is a function defined as 1. For all P, Q∈G, for all a, b∈Z, $e(P^a, Q^b)=e(P, Q)^{ab}$.
2. There exists some P, Q∈G such that $e(P, Q) \neq 1$, where 1 is the identity of $G_T$.
3. There exists an efficient algorithm for computing e.

Referring again to FIG. 6, at process block 326, the issuer selects random values x and y. Once x and y are selected, at process block 328, the issuer computes $X=g^x$ and $Y=g^y$. At process block 330, the group public key is $(q, G, g, G_T, g_T, e, X, Y)$, the private key for the issuer is $(x, y)$ output by the issuer. In one embodiment, random selection of platform parameters x and y is performed by picking a random seed value and generating values x and y with a pseudo-random number generator. In one embodiment, the issuer's secret key is $(x, y)$.

Figure 7:
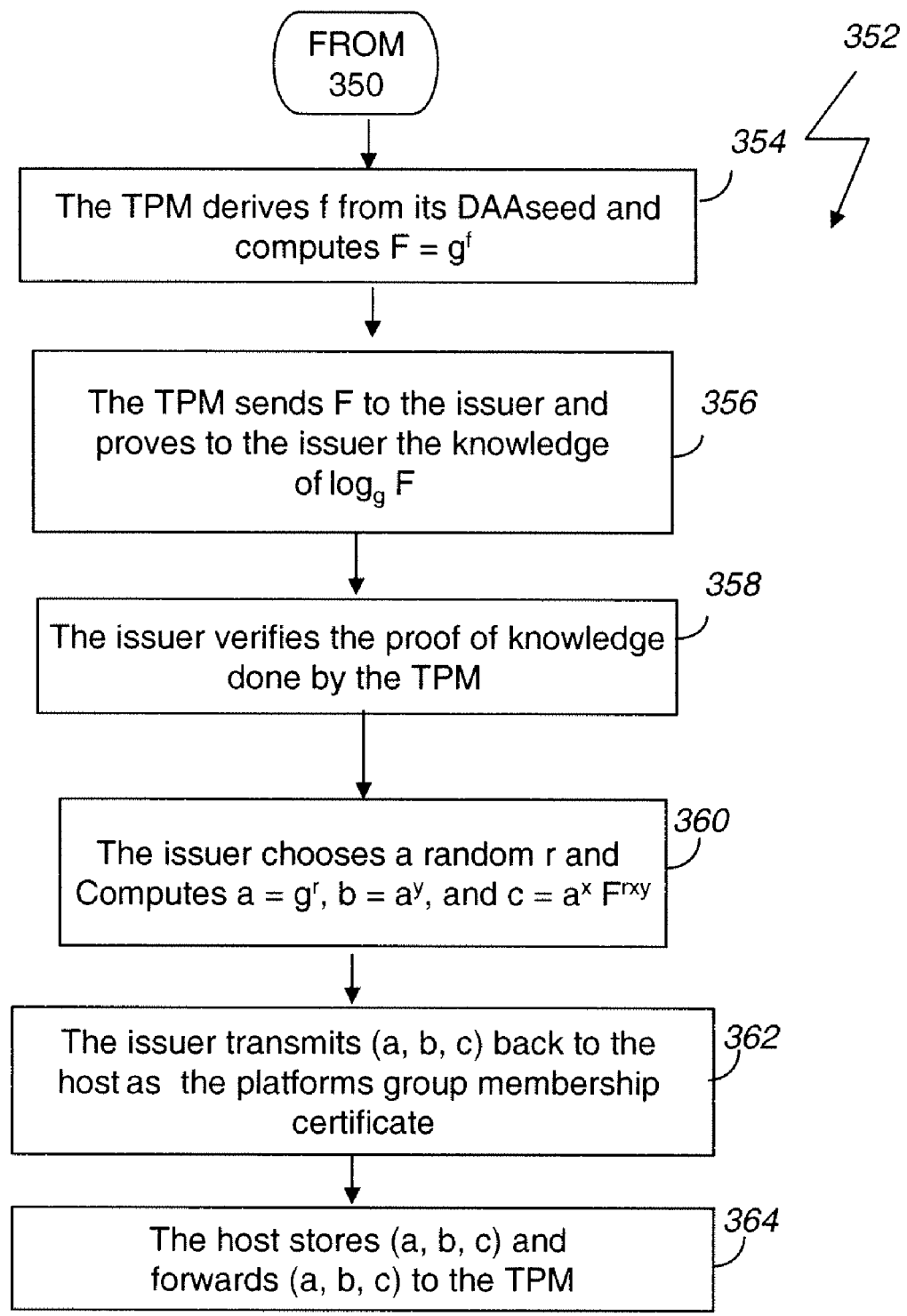
FIG. 7 is a flowchart illustrating a method for a join protocol to certify a member device of the trusted membership group, in accordance with one embodiment.

Once the platform group public/private key are formed, the issuer may certify each member of the platform group according to a join procedure, as further illustrated with reference to FIG. 7. Representatively, FIG. 7 is a flowchart illustrating a method 352 for certifying member devices of a defined trusted membership group of process block 350 of FIG. 5, in accordance with one embodiment.

Representatively, a platform interacts with the issuer to join the group. At process block 354, the TPM derives a private member key f from its DAA seed that is not revealed to the issuer and sets $F=g^f$. At process block 356, the TPM sends F to the issuer and proves to the issuer the knowledge of $\log_g F$. At process block 358, the issuer verifies the proof of knowledge performed by the TPM. At process block 360, the issuer chooses a random r and computes $a=g^r$, $b=a^y$, and $c=a^x F^{rxy}$. At process block 362, the issuer sends (a, b, c) back to the host as the platform's membership certificate. At process block 364, the host forwards (a, b, c) to the TPM. In one embodiment, the private signature key of a member device includes the private member key f as well as the membership certificate (a, b, c) as (f, a, b, c).

In one embodiment, the TPM also performs a signature proof of knowledge (SPK) to the issuer as follows (this corresponds to process block 356 and 358):

$SPK\{(f): F=g^f\}$.

1. The TPM chooses a random $r \in Z_q$ and computes $T=g^r$
2. The TPM computes $c=H(q\|g\|g_T\|G\|G_T\|e\|X\|Y\|T)$.
3. The TPM computes $s=r+c \cdot f \mod q$.
4. The TPM sends (F, c, s) to the issuer.
5. The issuer computes $T'=g^s F^{-c}$.
6. The issuer verifies that $c=H(q\|g\|g_T\|G\|G_T\|e\|X\|Y\|T')$.

Figure 8:
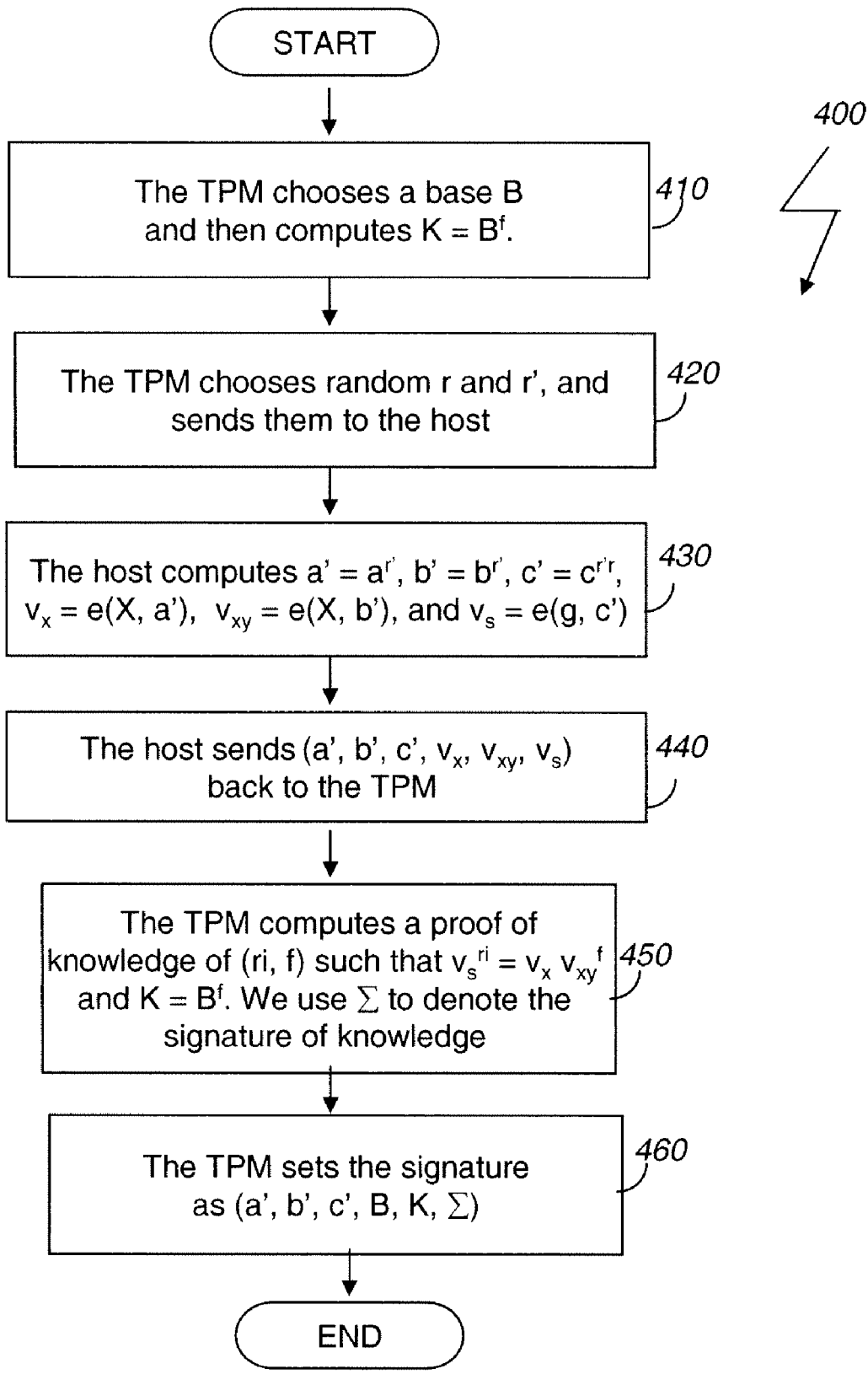
FIG. 8 is a flowchart illustrating a method for generating a private signature key in response to a received certification request, in accordance with one embodiment.

FIG. 8 is flowchart illustrating a method 400 for computing a private signature key by a member device of platform group, in accordance with one embodiment. At process block 410, the TPM chooses a base B. To sign a message m, the TPM has (f, a, b, c) as secret signature key and the host has (a, b, c). In the random base option, the TPM chooses B randomly from group $G_T$. In the named-base option, the TPM derives B from the verifier's base-name. The TPM then computes a pseudonym $K=B^f$. At process block 420, the TPM chooses two random numbers r and r', and sends them to the host. At process block 430, the host computes $a'=a^{r'}$, $b'=b^{r'}$, and $c'=c^{r'r}$, then computes $v_x=e(X, a')$, $v_{xy}=e(X, b')$, and $v_s=e(g, c')$. At process block 440, the host sends $(a', b', c', v_x, v_{xy}, v_s)$ back to the TPM. At process block 450, the TPM computes a zero-knowledge proof of knowledge of (ri, f) such that $v_s^{ri}=v_x v_{xy}^f$ and $K=B^f$ without revealing ri and f, where ri is inverse of r modulo q. We use Σ to denote the signature of knowledge of the above proof. At process block 460, the signature created is then $(a', b', c', B, K, \Sigma)$.

In one embodiment, the TPM could choose B from any group G where the decisional Diffie-Hellman problem in G is hard. The revocation check can be performed on G instead of $G_T$.

In one embodiment, the TPM pre-computes $e(X, a)$, $e(X, b)$, and $e(g, c')$. The TPM chooses two random numbers r and r', and sends them to the host. The host only computes $a'=a^{r'}$, $b'=b^{r'}$, and $c'=c^{r'r}$. And then the TPM computes $v_x=e(X, a)^{r'}$, $v_{xy}=e(X, b)^{r'}$, and $v_s=e(g, c)^{r'r}$. The host sends $(a', b', c')$ back to the TPM.

In one embodiment, the TPM computes a "signature of knowledge" as follows $$SPK\{(r,f): v_s^{ri}=v_x v_{xy}^f K=B^f\}(m)$$

(a) The TPM chooses two random integers rr, rf∈$Z_q$ and computes $$T_1=v_s^{rr} v_{xy}^{-rf} \quad T_2=B^{rf}$$

(b) The TPM computes $$c=H$$
$$(q\|g\|g_T\|G\|G_T\|e\|X\|Y\|a'\|b'\|c'\|v_x\|v_{xy}\|v_s\|B\|K\|T_1\|T_2\|m).$$

The TPM computes $$ri=r^{-1} \bmod q, \; sr=rr+c \cdot ri \bmod q, \; sf=rf+c \cdot f \bmod q.$$

The TPM sends (c, sr, sf) to the host.

The host sends the signature $\sigma=(B, K, a', b', c', sr, sf)$, where $\Sigma=(sr, sf)$, to the verifier.

Accordingly, using private signature key (f, a, b, c), the trusted hardware device is allowed to identify itself as a trusted hardware device by indicating that the device is a member of a group of trusted anonymous hardware devices defined by, for example, a certifying manufacturer, referred to herein as an issuer. In one embodiment, each hardware device, which is a member of a platform group, is assigned a unique, private signature key. Representatively, a trusted hardware device, having an assigned private signature key, is able to sign a message received as part of an authentication request from a verifier. However, in contrast to a traditional digital signature system, verification of a digital signature created with a unique, private signature key of a member device is verified using a group public key for the platform group defined by the issuer.

Figure 9:
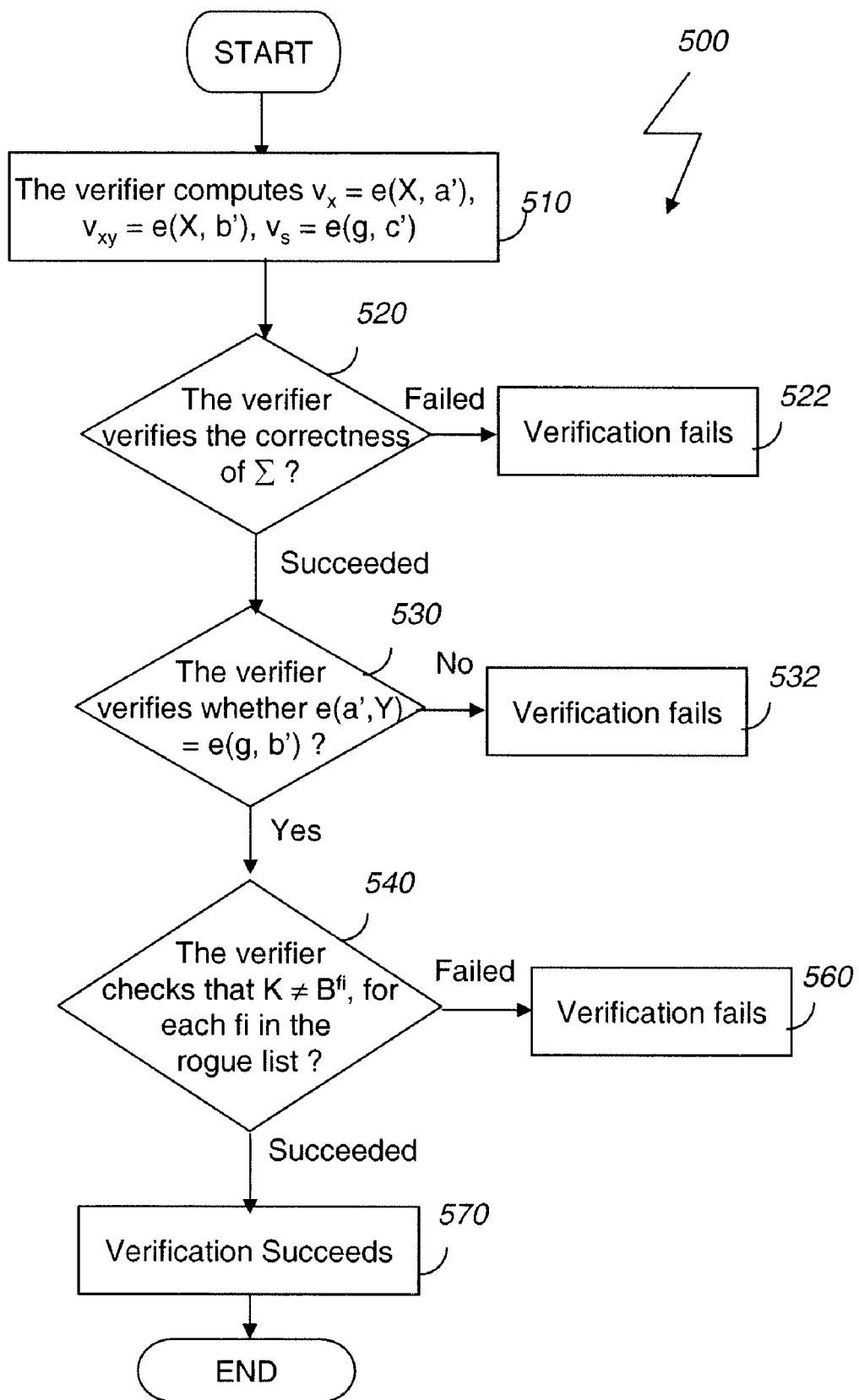
FIG. 9 is a flowchart illustrating a method for verifying a group digital signature of a device to authenticate the device as a trusted member device of a trusted membership group, in accordance with one embodiment.

FIG. 9 is a flowchart illustrating a method 500 for a verification algorithm to check signatures for validity with respect to the group public key, in accordance with one embodiment. A group signature consists of $(a', b', c', B, K, \Sigma)$. At process block 510, the verifier first computes $v_x=e(X, a')$, $v_{xy}=e(X, b')$, $v_s=e(g, c')$. At process block 520, the verifier verifies the correctness of Σ the signature of knowledge; otherwise, verification fails at process block 522. Once the signature is verified, at process block 530, the verifier checks that $e(a', Y)=e(g, b')$ holds; otherwise, verification fails at process block 532. At process block 540, the verifier checks whether the signature has been revoked, i.e., for each revoked member key fi in the rogue list, the verifier checks that $K \neq B^{fi}$.

For example, to verify a group signature $\sigma=(B, K, a', b', c', sr, sf)$ on m, the verifier does the following steps:

1. The verifier verifies that $e(a', Y)=e(g, b')$ and $B \in G_T$.
2. The verifier computes $$v_x=e(X,a') \; v_{xy}=e(X,b') \; v_s=e(g,c')$$

The verifier $$T'_1=v_s^{sr} v_{xy}^{-sf} v_x^{-c} \; T'_2=B^{sf} K^{-c}$$

The verifier verifies that $$c=H$$
$$(q\|g\|g_T\|G\|G_T\|e\|X\|Y\|a'\|b'\|c'\|v_x\|v_{xy}\|v_s\|B\|K\|T'_1\|T'_2\|m).$$

Figure 10:
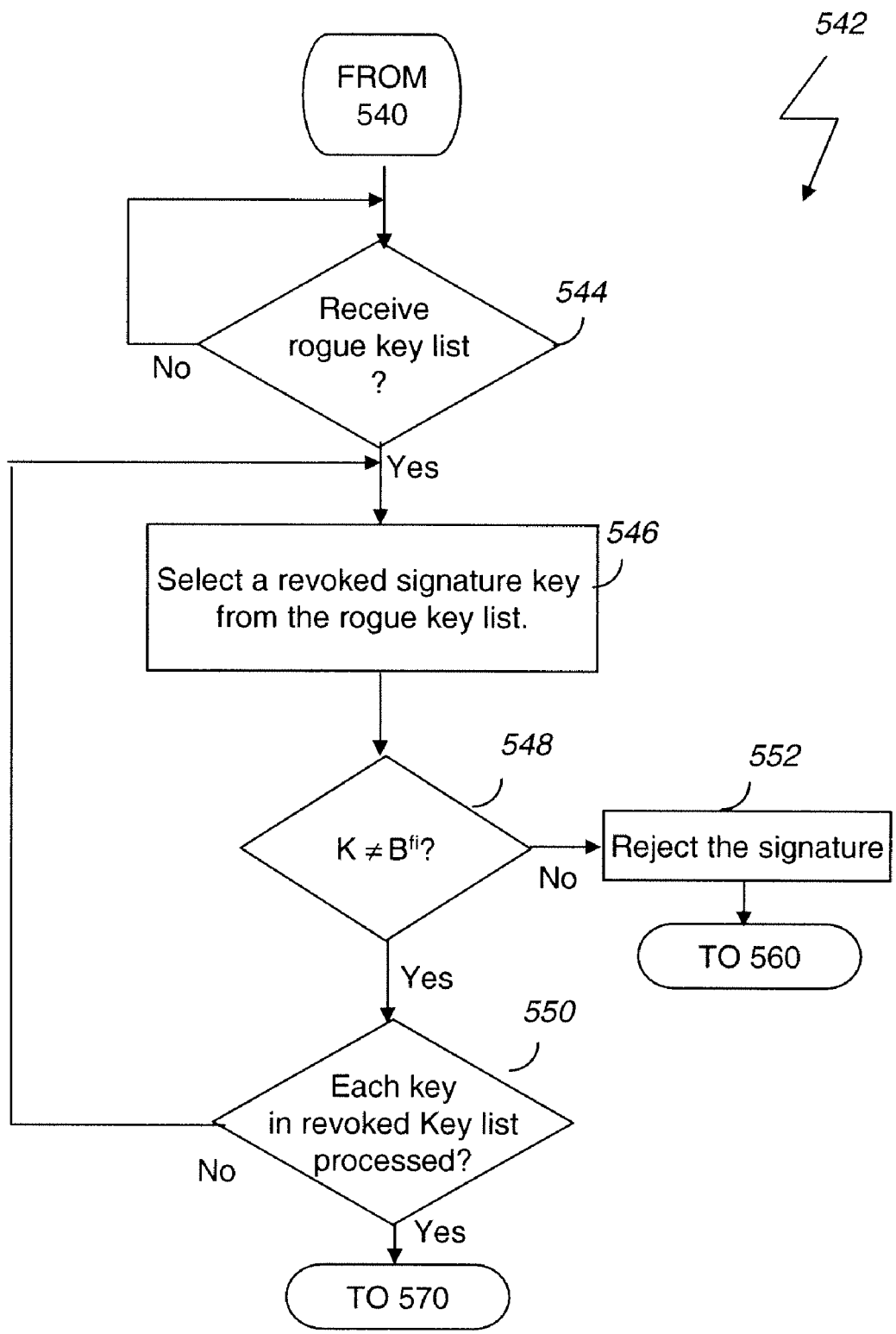
FIG. 10 is a flowchart illustrating a method to verify that a private signature key used to generate a received signature includes a non-revoked private member key, in accordance with one embodiment.

For each fi in rogue-list, the verifier checks that $K \neq B^{fi}$ as shown in FIG. 10. If a matching revoked member key is detected, verification fails at process block 560; otherwise, verification succeeds at process block 570.

FIG. 10 is a flowchart illustrating a method 542 for ensuring that a private signature key of a member device is an unrevoked private signature key, in accordance with one embodiment. Accordingly, at process block 544, it is determined whether a rogue key list is received. Once received, at process block 546, a revoked member key is selected from the rogue key list. At process block 548, it is determined whether a pseudonym value K received as part of the digital signature is not equal to an equation of the form $K=B^{fi}$. If the pseudonym value K equals the equation, the signature is rejected at process block 552. Otherwise, at process block 550, process blocks 546-548 are repeated for each revoked member key in the revoked key list until each key in the revoked key list is processed. Accordingly, assuming that value K of the group signature does not match $B^{fi}$, the digital signature received from the member device is accepted.

In one embodiment, the member or trusted hardware device may generate a standard public/private key pair using a conventional cryptographic protocol, such as ECC. Accordingly, in one embodiment, the private signature key of the member device may be used to sign a public ECC key to illustrate that the public key was generated by a trusted hardware device. Accordingly, subsequent transactions may be performed using the conventional public/private key ECC pair following initial authentication of the member device as a trusted hardware device of a platform group.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method at a verifier comprising:
   requesting verification that an anonymous hardware device is a trusted member device of a trusted membership group;

authenticating a received verification from the anonymous hardware device according to published cryptographic information from the trusted membership group; and performing a first verification that the anonymous hardware device remains a trusted member device of the trusted membership group according to a private member key component of a private signature key of the anonymous hardware device;

receiving a rogue key list specifying a plurality of revoked member keys;

performing a second verification that the anonymous hardware device remains a trusted member device of the trusted membership group according to the rogue key list of revoked member keys, wherein the second verification comprises a determination that the private member key component of a private signature key of the anonymous hardware device is cryptographically eliminated as a match to any one of the plurality of revoked member keys in the rogue key list via processing of each key in the revoked key list; and wherein the first verification and the second verification are performed without determining the private member key or any unique device identification information of the anonymous hardware device to enable a trusted member device to remain anonymous to the verifier.

2. The method of claim 1, wherein requesting verification further comprises:

issuing a message to the anonymous hardware device to request the verification that the anonymous hardware device is a trusted member device of the trusted membership group; and receiving a group digital signature from the anonymous hardware device, the group digital signature generated by the anonymous hardware device using the private signature key of the anonymous hardware device to sign the issued message, the private signature key including the private member key and a group membership certificate of the anonymous hardware device.

3. The method of claim 1, wherein authenticating the received verification further comprises:

identifying a group public key of the trusted membership group; and authenticating a received group digital signature according to the group public key of the trusted membership group, the group digital signature generated by the anonymous hardware device using the private signature key of the anonymous hardware device to sign a message issued to the anonymous hardware, the private signature key including the private member key and a group membership certificate of the anonymous hardware device.

4. The method of claim 1, further comprising:

denying authentication of the anonymous hardware device if the private member key component of the private signature key of the anonymous hardware device matches a revoked member key from the rogue list of revoked member keys.

5. The method of claim 4, wherein denying authentication further comprises:

determining whether the group digital signature of the anonymous hardware device was generated with a private signature key having a revoked member key component; and if the group digital signature was created with a revoked member key, identifying the anonymous hardware device as an untrusted hardware device.

6. The method of claim 4, wherein denying authentication further comprises:

(a) selecting a revoked member key from the rogue list;

(b) verifying that a pseudonym, cryptographic parameter, K, of the group digital signature of the anonymous hardware device was not created with the selected revoked member key if $K \neq B^{fi}$, where fi is the selected, revoked member key, B is a cryptographic parameter of the group digital signature of the anonymous hardware device, i is an integer from 1 to n, n is an integer greater than 1 and K is of the form $K=B^f$, where f is the private member key of the anonymous hardware device;

(c) repeating (a)-(b) for each revoked member key, fi, listed in the rogue list; and (d) if the group digital signature was created with a revoked member key from the rogue list, identifying the anonymous hardware device as an untrusted hardware device.

7. A method at an issuer, wherein the method comprises:

creating a group public/secret key pair for a trusted membership group defined by the issuer;

verifying that an anonymous hardware device has generated a secret member key component of a secret signature key without disclosure of the secret member key of the anonymous hardware device to the issuer;

assigning a unique group membership certificate to the anonymous hardware device to render the anonymous hardware device a trusted member device of the trusted membership group, the secret signature key including the secret member key and the group membership certificate of the anonymous hardware device; and publishing the group public key to enable a verifier to:

perform a first verification that the anonymous hardware device remains a trusted member device of the trusted membership group according to a secret member key component of the secret signature key of the anonymous hardware device;

perform a second verification that the anonymous hardware device remains a trusted member device of the trusted membership group according to a rogue key list of revoked member keys received by the verifier, wherein the second verification comprises a determination that the secret member key component of a secret signature key of the anonymous hardware device is cryptographically eliminated as a match to any one of the plurality of revoked member keys in the rogue key list via processing of each key in the revoked key list; and wherein the first verification and the second verification are to be performed by the verifier without the verifier determining the secret member key or any unique device identification information of the anonymous hardware device to enable a trusted member device to remain anonymous to the verifier.

8. The method of claim 7, wherein the issuer is a certifying manufacturer of the trusted hardware device.

9. The method of claim 7, wherein verifying further comprises: receiving a pseudonym, F, of the form $F=g^f$, where f is the secret member key and g is a cryptographic parameter of the group public key; receiving a proof from the anonymous hardware device to verify that the secret member key is stored within the anonymous hardware device, the proof comprising a proof of knowledge of the form $\log_g F$.

10. The method of claim 9, further comprising:

selecting, by the issuer, a random value, r;

computing, by the issuer, $a=g^r$, $b=a^y$, and $c=a^x F^{rxy}$, where (x, y) is the secret key of the issuer, and (a, b, c) is the group membership certificate.

11. The method of claim 7, wherein assigning a group membership certificate comprises:

sending, by the issuer, (a, b, c) to a host of the trusted member device as the group membership certificate, where $a=g^r$, $b=a^y$, and $c=a^x F^{rxy}$, (x, y) is the secret key of the issuer, F is a pseudonym of the form $F=g^f$, f is the secret member key and g is a cryptographic parameter of the group public key; and forwarding, by the host the group membership certificate (a, b, c) to the trusted member device, wherein (f, a, b, c) is the secret signature key of the trusted member device.

12. A method in an anonymous hardware device, wherein the method comprises:

signing, by the anonymous hardware device, a message received from a verifier, the message signed using a private signature key of the anonymous hardware device;

transmitting a digitally signed message, including a group digital signature of the anonymous hardware device to the verifier, the verifier to authenticate the group digital signature to verify that the anonymous hardware device is a trusted member device of a trusted membership group by performing the following operations:

performing a first verification that the anonymous hardware device remains a trusted member device of the trusted membership group according to a private member key component of the private signature key of the anonymous hardware device;

performing a second verification that the anonymous hardware device remains a trusted member device of the trusted membership group according to a rogue key list of revoked member keys received by the verifier, wherein the second verification comprises a determination that the private member key component of a private signature key of the anonymous hardware device is cryptographically eliminated as a match to any one of the plurality of revoked member keys in the rogue key list via processing of each key in the revoked key list; and wherein the first verification and the second verification are to be performed by the verifier without the verifier determining the private member key or any unique device identification information of the anonymous hardware device to enable a trusted member device to remain anonymous to the verifier.

13. The method of claim 12, wherein prior to signing, the method comprises:

receiving a denial of verification if the private member key component of the anonymous hardware device matches a revoked member key from the rogue list of revoked member keys.

14. The method of claim 12, wherein prior to signing, the method further comprises:

deriving a random, secret value, f, according to an attestation seed;

computing a value, F, of the form $F=g^f$, where g is a cryptographic parameter of a group public key of a trusted membership group;

sending the value, F, to an issuer of the trusted membership group as a request to join the trusted membership platform group;

sending a proof to the issuer to verify that a private member key is stored within the anonymous hardware device, the proof comprising a proof of knowledge of the form $\log_g F$; and receiving a group membership certificate (a, b, c) if the issuer verifies the correctness of the proof of knowledge, where the random, secret value, f, is the private member key component of the private signature key (f, a, b, c) of the trusted member device and is verified according to the group public key to enable the trusted member device to remain anonymous to any verifiers.

15. The method of claim 12, wherein signing further comprises:

selecting, by a trusted platform module (TPM) of the anonymous hardware device, a base value, B;

computing, by the TPM, a pseudonym, K, of the form $K=B^f$, where f is the private member key of the anonymous hardware device;

sending, by the TPM, two random numbers r and r' to a host of the anonymous hardware device;

computing, by the host, $a'=a^r$, $b'=b^r$, and $c'=c^r$, where a, b and c are cryptographic parameters of a group membership certificate of the trusted membership group; and computing, by the host, $v_x=e(X, a')$, $v_{xy}=e(X, b')$, and $v_s=e(g, c')$, where X and Y are cryptographic parameters of a group public key of the trusted membership group, q is a prime number, G and $G_T$ are groups of order q, e: $G \times G \rightarrow G_T$ is an efficiently computable bilinear map function, g is the generator of group G and $g_T$ is the generator of group $G_T$.

16. The method of claim 15, further comprising:

receiving, from the host, (a', b', c', $v_x$, $v_{xy}$, $v_s$);

computing, by the TPM, a zero-knowledge proof of knowledge of (ri, f) such that $v_s^{ri}=v_x v_{xy}^f$ and $K=B^f$ without revealing ri and f, where ri is an inverse of r modulo q; and sending (a', b', c', B, K, Σ.) to the verifier as the digital signature of the anonymous hardware device, where .Σ denotes the zero-knowledge proof of knowledge.

17. An apparatus, comprising:

a flash memory to store a private signature key assigned to the apparatus by an issuer; and a trusted platform module (TPM) to sign a message received from a verifier, the message signed using the private signature key and to transmit a digitally signed message including a group digital signature of the apparatus to the verifier, wherein the verifier to authenticate the group digital signature to verify that the anonymous hardware device is a trusted member device of a trusted membership group by performing the following operations responsive to the apparatus transmitting the digitally signed message:

perform a first verification that the apparatus remains a trusted member device of the trusted membership group according to a private member key component of the private signature key of the apparatus;

performing a second verification that the apparatus remains a trusted member device of the trusted membership group according to a rogue key list of revoked member keys received by the verifier, wherein the second verification comprises a determination that the private member key component of a private signature key of the apparatus is cryptographically eliminated as a match to any one of the plurality of revoked member keys in the rogue key list via processing of each key in the revoked key list; and wherein the first verification and the second verification are to be performed by the verifier without the verifier determining the private member key or any unique device identification information of the apparatus to enable a trusted member device to remain anonymous to the verifier.

18. The apparatus of claim 17, wherein the apparatus comprises an identification card having an integrated circuit including the TPM.

19. The apparatus of claim 18, wherein the identification card is a state driver's license and the issuer is the state department of motor vehicles.

20. A system, comprising:
a verifier platform coupled to a network; and
an anonymous prover platform coupled to the network comprising:
a bus,
a processor coupled to the bus,
a chipset coupled to the bus, including a trusted platform module (TPM), the trusted platform module to sign a message received from the verifier platform, the message signed using a private signature key of the prover platform and to transmit a digitally signed message including a group digital signature of the prover platform to the verifier platform, the verifier platform to authenticate the group digital signature to verify that the anonymous prover platform is a trusted member device of a trusted membership group by performing the following operations;
the verifier platform to perform a first verification that the prover platform remains a trusted member device of the trusted membership group according to a private member key component of the private signature key of the prover platform;
the verifier platform to perform a second verification that the prover platform remains a trusted member device of the trusted membership group according to a rogue key list of revoked member keys received by the verifier platform, wherein the second verification comprises a determination that the private member key component of a private signature key of the prover platform is cryptographically eliminated as a match to any one of the plurality of revoked member keys in the rogue key list via processing of each key in the revoked key list and
wherein the first verification and the second verification are to be performed by the verifier platform without the verifier platform determining the private member key or any unique device identification information of the prover platform to enable a trusted member device to remain anonymous to the verifier platform.

21. The system of claim 20, wherein the verifier platform comprises:
authentication logic to determine whether the group digital signature of the prover platform was generated with a revoked member key and to identify the prover platform as an untrusted hardware device if the group digital signature was created with the revoked member key.

22. The system of claim 20, wherein the prover platform receives a denial of revocation from the verifier platform if the private member key of the prover platform does not match any revoked private member keys from a rogue list of compromised member keys without disclosing the private member key or any unique device identification information of the anonymous prover platform to enable a trusted member device to remain anonymous to the verifier platform.

23. The system of claim 20, wherein the prover platform comprises:
key logic to generate a secret member key, f, according to a predetermined seed value;
join logic to compute cryptographic parameters for receiving a group membership certificate (a, b, c) of the prover platform, the private signature key (f, a, b, c) of the prover platform including the secret member key f and cryptographic parameter (a, b, c) of the group membership certificate of the prover platform.

24. The system of claim 20, wherein the chipset comprises a graphics controller.

25. The system of claim 20, wherein the network comprises a wide area network.

* * * * *